(12) United States Patent
Benisty et al.

(10) Patent No.: US 11,294,595 B2
(45) Date of Patent: Apr. 5, 2022

(54) ADAPTIVE-FEEDBACK-BASED READ-LOOK-AHEAD MANAGEMENT SYSTEM AND METHOD

(71) Applicant: Western Digital Technologies, Inc., San Jose, CA (US)

(72) Inventors: Shay Benisty, Beer Sheva (IL); Ariel Navon, Revava (IL); Alexander Bazarsky, Holon (IL)

(73) Assignee: Western Digital Technologies, Inc., San Jose, CA (US)

( * ) Notice: Subject to any disclaimer, the term of this patent is extended or adjusted under 35 U.S.C. 154(b) by 229 days.

(21) Appl. No.: 16/223,850

(22) Filed: Dec. 18, 2018

(65) Prior Publication Data

US 2020/0192602 A1 Jun. 18, 2020

(51) Int. Cl.
*G06F 3/06* (2006.01)
*G06F 9/50* (2006.01)

(52) U.S. Cl.
CPC ............ *G06F 3/0659* (2013.01); *G06F 3/061* (2013.01); *G06F 3/0679* (2013.01); *G06F 9/5016* (2013.01)

(58) Field of Classification Search
CPC .................................................. G06F 3/0659
USPC .......................................................... 711/154
See application file for complete search history.

(56) References Cited

U.S. PATENT DOCUMENTS

| | | | | |
|---|---|---|---|---|
| 2004/0019745 | A1* | 1/2004 | Espeseth | G06F 3/0613 711/137 |
| 2009/0019229 | A1* | 1/2009 | Morrow | G06F 12/0862 711/137 |
| 2012/0117329 | A1* | 5/2012 | Anderson | G06F 12/123 711/136 |
| 2015/0074353 | A1* | 3/2015 | Ge | G06F 9/3016 711/125 |
| 2016/0019155 | A1 | 1/2016 | Radhakrishnan et al. | |
| 2017/0109096 | A1 | 4/2017 | Jean et al. | |
| 2017/0228157 | A1 | 8/2017 | Yang et al. | |
| 2018/0285282 | A1* | 10/2018 | Jakowski | G06F 12/0246 |
| 2018/0314421 | A1 | 11/2018 | Linkovsky et al. | |

* cited by examiner

*Primary Examiner* — Jae U Yu
(74) *Attorney, Agent, or Firm* — Dickinson Wright PLLC; Steven C. Hurles

(57) ABSTRACT

An adaptive-feedback-based read-look-ahead management system and method are provided. In one embodiment, a method for stream management is presented that is performed in a storage system. The method comprises performing a read look ahead operation for each of a plurality of streams; determining a success rate of the read look ahead operation of each of the plurality of streams; and allocating more of the memory for a stream that has a success rate above a threshold than for a stream that has a success rate below the threshold. Other embodiments are provided.

8 Claims, 9 Drawing Sheets

ADAPTIVE-FEEDBACK-BASED READ-LOOK-AHEAD MANAGEMENT SYSTEM AND METHOD

BACKGROUND

A storage system can be used with a host, and both can operate under a standard, such as the Non-Volatile Memory Express (NVMe) standard. The NVMe standard provides for a virtualization environment, in which a storage system can be used with a plurality of virtual hosts. Some storage systems use a read-look-ahead mechanism that speculatively fetches data from memory to temporal buffers, while trying to avoid memory sense and transfer latency. Read-look-ahead can be desirable when that memory system operates under the NVMe standard.

DETAILED DESCRIPTION

Figure 1A:
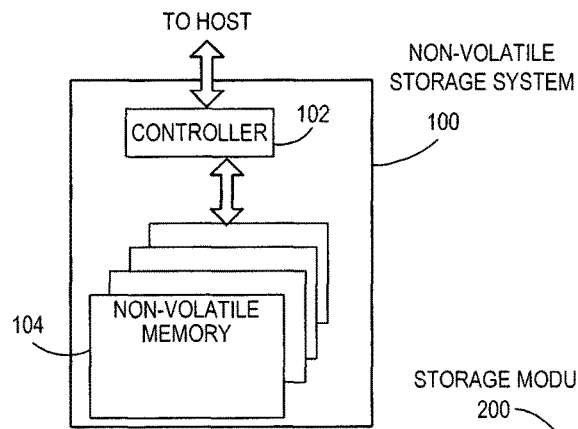
FIG. 1A is a block diagram of a non-volatile storage system of an embodiment.

By way of introduction, the below embodiments relate to an adaptive-feedback-based read-look-ahead management system and method. In one embodiment, a method for stream management is presented that is performed in a storage system. The method comprises performing a read look ahead operation for each of a plurality of streams; determining a success rate of the read look ahead operation of each of the plurality of streams; and allocating more memory for a stream that has a success rate above a threshold than for a stream that has a success rate below the threshold.

In some embodiments, the success rate is determined by comparing a logical block address received from a host with a logical block address predicted by the read look ahead operation.

In some embodiments, the method further comprises removing at least one of the streams based on the success rate.

In some embodiments, the storage system is embedded in a host.

In some embodiments, each stream represents a group of data that belongs to identifiable sets of physical locations in memory that are allocated and freed together.

In some embodiments, performing the read look ahead operation comprises speculatively fetching data from memory to temporal buffers.

In another embodiment, a method for stream management is provided that is performed in a storage system. The method comprises: receiving a command from a host; performing a read look ahead operation; determining whether a relevant stream exists; in response to determining that a relevant stream exists, returning expected read data; and in response to determining that a relevant stream does not exist, opening a new stream.

In some embodiments, the method further comprises determining if a number of streams is greater than a threshold.

In some embodiments, the method further comprises performing a read look ahead update management operation in response to determining that the number of streams is greater than the threshold.

In another embodiment, a storage system is presented comprising a controller configured to characterize each of a plurality of streams and unify streams together based on characterization of each stream.

In some embodiments, the controller is configured to unify the streams using principle component analysis.

In some embodiments, the controller is configured to characterize each of a plurality of streams using one or more of the following: number of commands in a stream, prediction success rate of a stream, trend of a stream, command type in a stream, last active time of a stream, average time between consecutive commands in a stream, and average gap between commands in a stream.

In some embodiments, the controller is further configured to perform a read look ahead operation.

In some embodiments, the controller is further configured to open a new stream in response to the read look ahead operation.

In some embodiments, the controller is further configured to: determine if a number of streams in the plurality of streams exceeds a threshold number; and in response to determining that the number of streams in the plurality of streams exceeds the threshold number, perform a real look ahead management operation.

Other embodiments are possible, and each of the embodiments can be used alone or together in combination. Accordingly, various embodiments will now be described with reference to the attached drawings.

Figure 1B:
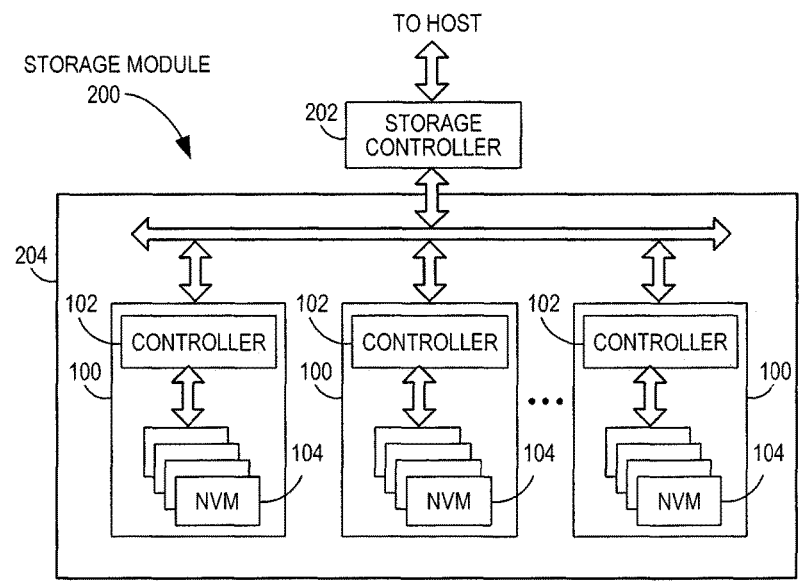
FIG. 1B is a block diagram illustrating a storage module of an embodiment.
Figure 1C:
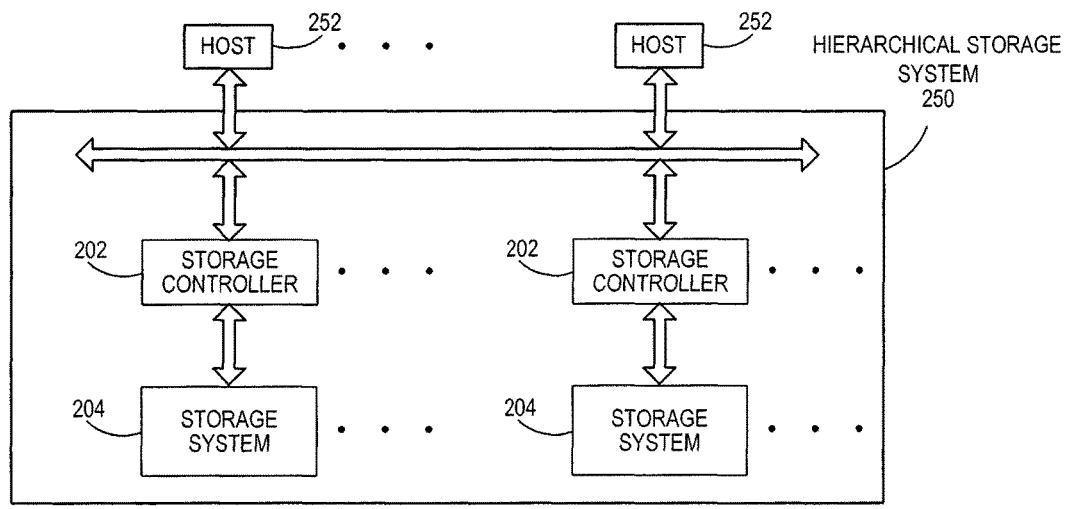
FIG. 1C is a block diagram illustrating a hierarchical storage system of an embodiment.

Turning now to the drawing, storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. (The terms "memory" and "media" may be used interchangeably herein.) Controller 102 interfaces with a host system and transmits command sequences for read, program, and erase operations to non-volatile memory die 104.

The controller 102 (which may be a flash memory controller) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address.) The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some NAND storage system architectures (such as the ones shown in FIGS. 1B and 1C), 2, 4, 8 or more NAND channels may exist between the controller and the NAND memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be an NVMe or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
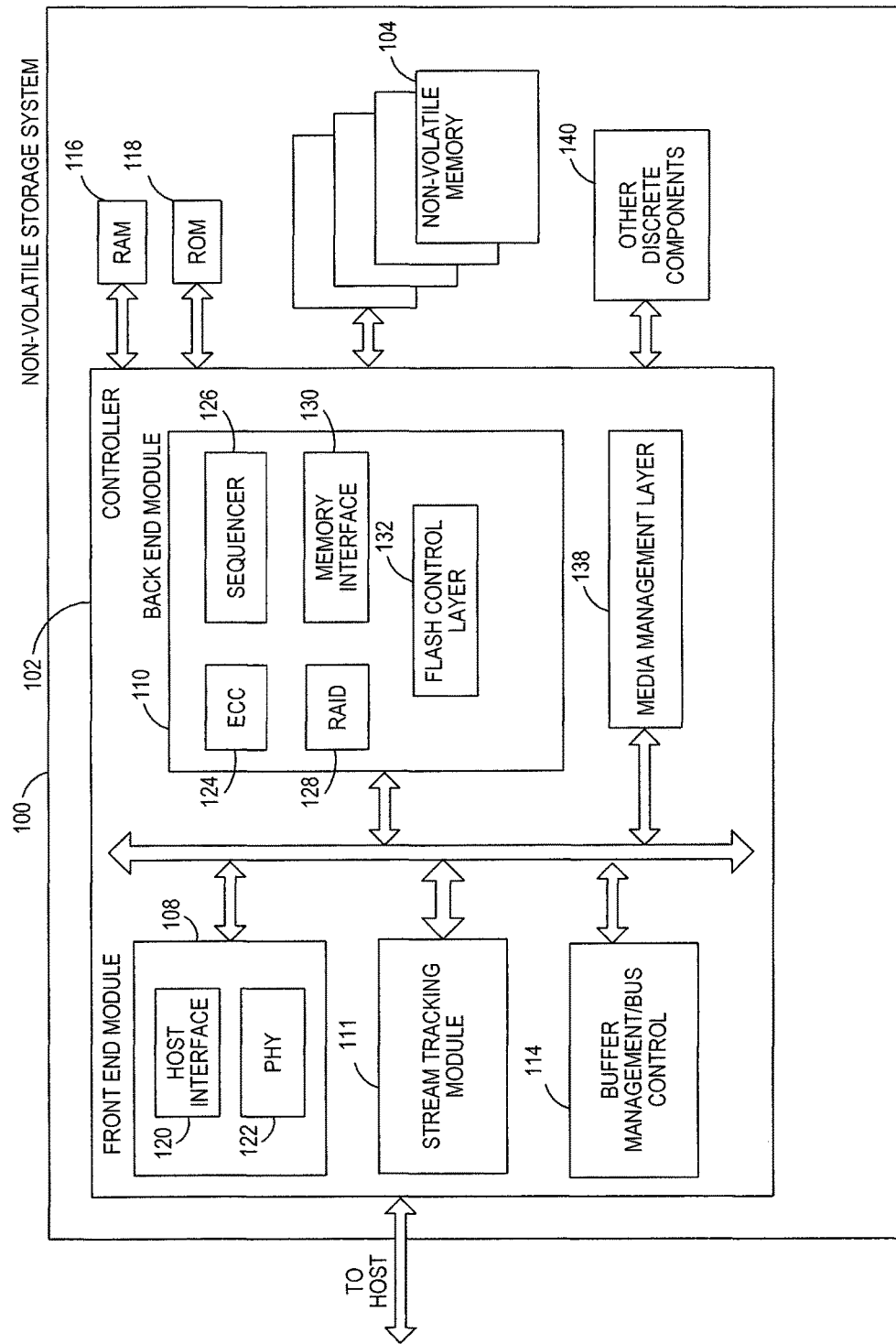
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. For example, in this embodiment, the controller 102 comprises a stream tracking module 111, which will be discussed in more detail below. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
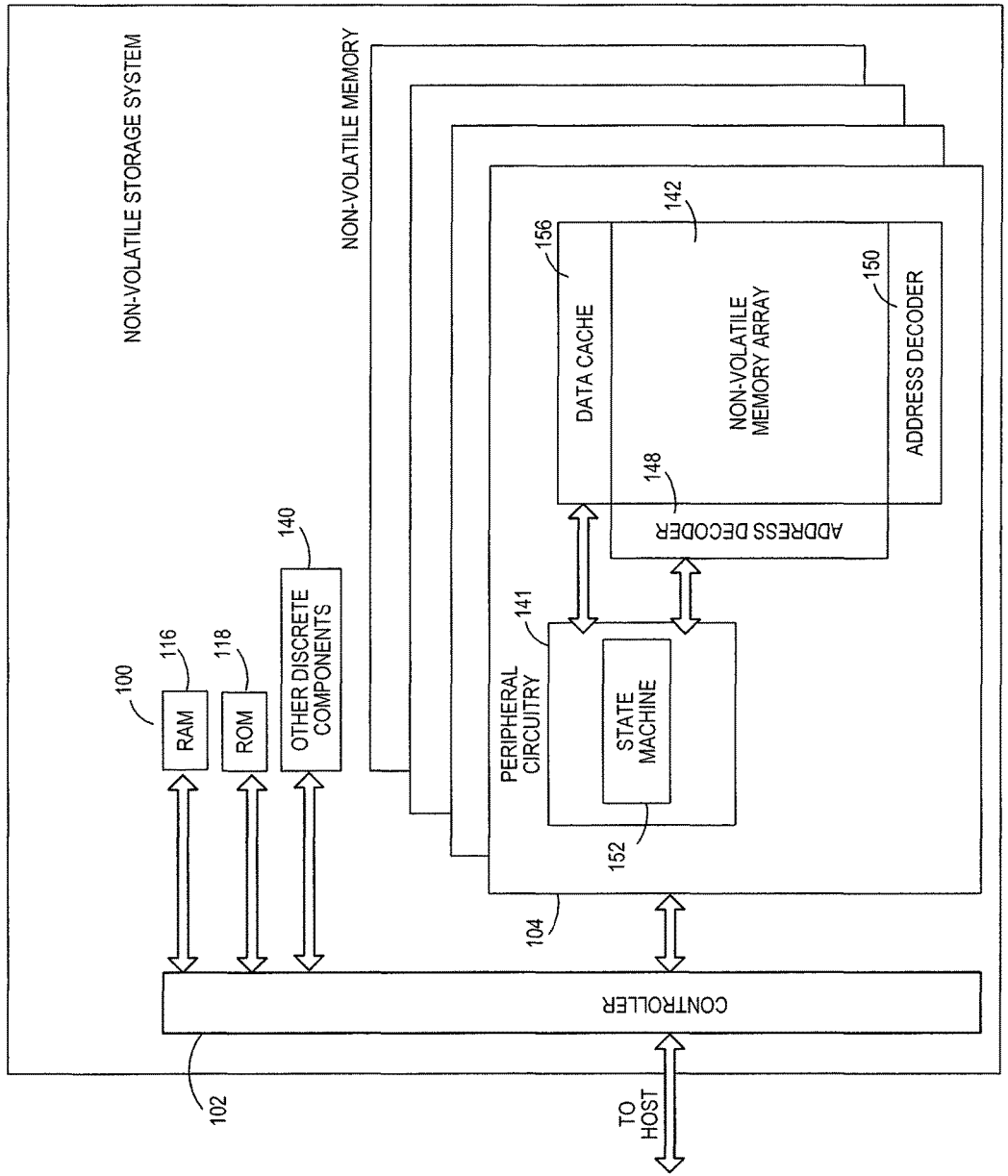
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including NAND flash memory cells and/or NOR flash memory cells in a two dimensional and/or three dimensional configuration. Non-volatile memory die 104 further includes a data cache 156 that caches data.

The storage system 100 (sometimes referred to herein as the storage media or device) can be used with a host, and both can operate under a standard or specification. One such specification is the Non-Volatile Memory Express (NVMe) specification. NVMe is a scalable host controller interface designed to address the needs of Enterprise and Client systems that utilize peripheral component interface express (PCIe)-based solid state drives. It is based on a paired submission and completion queue mechanism. Commands are placed by host software into a submission queue (SQ). Completions are placed into the associated completion queue (CQ) by the controller. Submission and completion queues are allocated either in host memory or device memory.

In one embodiment, the controller 102 of the storage system 100 comprises a read-look-ahead manager, which can be implemented in hardware and/or software. Read look ahead (RLA) is intended to speculatively fetch data from the memory to temporal buffers, while trying to avoid memory sense and transfer latency. The RLA has a special importance to systems working with NVMe standards, due to the fact that, in such systems, the host has multi-processors, and usually each processor has its own NVMe submission queue. Each processor can have any workload with high probability that the commands within a specific thread have a locality relation. However, the device fetches the commands from the submission queues out of order, while losing the locality of the commands which usually exist within a specific submission queue.

Figure 3:
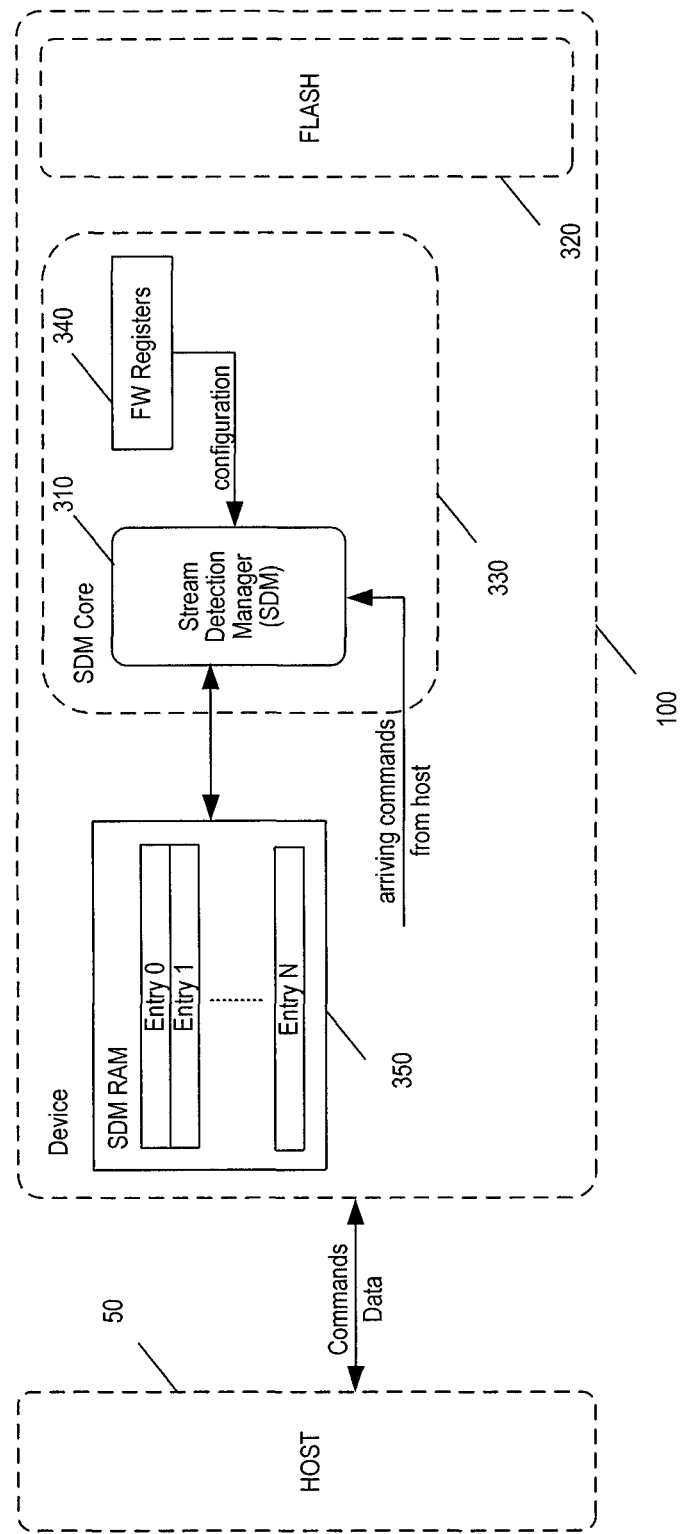
FIG. 3 is an illustration of a host and storage system of an embodiment.

FIG. 3 is an illustration of a host 50 and storage system 100 of an embodiment that employs a read-look-ahead mechanism. In this embodiment, the storage system 100 comprises a stream detection manager (SDM) 310 for command locality detection and flash memory 320. The SDM 310 may be part of an SDM core 330 that includes firmware (FW) registers 340 that may provide configuration input to the SDM 310. For example, the FW registers 340 may provide input regarding the MinGap (e.g., an indication of minimum proximity) and MaxGap (e.g., an indication of maximum proximity).

The host device 50 may send commands that are related to one another, such as sequential read commands, or may send commands that are random and unrelated to one another. The SDM 310 may analyze the locality of the commands, regardless of randomness, in order to process the commands more efficiently. For example, even if the commands themselves are random, the logical block addresses (LBAs) of the commands may have sequentiality. In this regard, a locality analysis may identify the sequentiality, so that the memory device 100 may cache the data from flash memory 320 and may therefore process the host commands more efficiently.

In one implementation, the SDM 310 may inspect incoming commands to determine if they are perfectly or nearly sequential to one of the last set of incoming commands of the same direction (e.g., read or write). Further, the SDM 310 may support ordered commands and out-of-order commands. In practice, the memory device 100 may parse the incoming command, check using the SDM 310 whether any locality is detected with the previously-parsed commands, and accumulate the contiguous commands into a specific entry (e.g., such as SDM RAM 350) according to the predefined parameters. When the preconfigured threshold is crossed, an entry may be declared as a stream. As used herein, a "stream" represents a group of data that belong to identifiable sets of physical locations and, hence, can be allocated and freed together. Each stream contains a specific pattern. So, streams enable data to be written and erased efficiently, which in turn reduces garbage collection and leads to reduced write amplification, as well as efficient flash utilization.

In one implementation, there is a maximum number of the concurrent entries. In this implementation, old entries in the list of potential entries may be removed and/or overridden. Further, in one implementation, the SDM 310 may use a locality detection algorithm. The memory device 100 may analyze one, some, or all of the commands fetched from the submission queue. For example, for each incoming command (InCmd), the SDM 210 may check if the command is a read command or a write command. For read commands, the SDM 310 checks the incoming command against all read streams. In one implementation, read streams may include read stream candidates and read streams. A read stream candidate is one or more commands that the SDM 310 has not yet determined to be a read stream. In a specific implementation, in response to certain characteristics of the read stream candidate (such as a certain number of commands being associated with the read stream candidate or the sum of the address ranges for the one or more commands associated with the read stream candidate being greater than a total address range length), the SDM 310 may change the designation from a read stream candidate to a read stream.

Conversely, for write commands, the SDM 310 checks the incoming command against all write streams (such as write stream candidates and write streams). Similar to read streams, a write stream candidate is one or more commands that the SDM 310 has not yet determined to be a write stream. Further, the SDM 310 may change the write stream candidate to a write stream in response to determining certain characteristics of the write stream candidate (such as total number of commands or the total address range for the commands associated with the write stream candidate). In one implementation, after designation as a write stream, the memory device 100 may use the designated write stream for further processing. For example, incoming read commands may be compared with write streams to determine whether to perform an RLA.

Further, the SDM 310 may iterate through each entry for the selected set (e.g., read or write) of stream candidates (Stream[x]) and check if the range of the coming command is local to an existing stream or a candidate stream. An incoming command may be assigned to a stream if the incoming command is deemed local (e.g., close enough in value) to one or more commands already assigned to a respective stream (e.g., close enough to the last command assigned to the respective candidate stream).

Various methods may be used to determine locality of the incoming command to the stream. In one implementation, a gap may be used to judge locality. For example, the gap may be based on the length of the incoming command and/or based on one or more commands already assigned to a respective stream (e.g., the length of the last command assigned to the respective candidate stream). In one implementation, the gap value may be calculated from the contents of three registers associated with each command direction. In a first specific implementation, the command may be assigned to the first candidate stream for which it is found to be within the gap distance of the command last added to the candidate stream. In a second specific implementation, the command may be assigned to the first candidate stream for which it is found to be within the gap distance of any command added to the candidate stream. The three parameters are:

LenMult: Length Multiplier is used to multiply the last command length (or another command length) to calculate the allowed gap. A command may be assigned to the stream if the distance to the last command (or to another command within the candidate stream) is less than or equal to the gap. This field may have any number.

MinGap: Minimum Gap is used for the gap value if the length multiplier times last command length is smaller than a predetermined amount. Minimum Gap may be used because the command length in streams is variable; and if the last command assigned to a respective stream is small, the SDM 310 may seek to substitute a different minimum gap value.

MaxGap: Maximum Gap is used for the gap value if the length multiplier times the last command length is larger than the amount of data that is sensible to pre-read.

Stream qualification may be performed by comparing the stream count and stream run length to threshold values. The threshold values may be entered in the configuration registers (such as firmware registers 340). Further, in one implementation, the threshold values may be different for read streams and write streams.

The locality condition may depend on the length of the last command in the entry and its range. First, the SDM 310 may calculate the allowed gap, which as discussed above may be defined by the LenMult, MinGap, MaxGap, and which may be defined by the firmware and the length of the last command.

The equation below describes one example of the calculation made by the SDM 310 in order to find the gap.

$$Gap=\min(\max(LAST\_LEN*LenMult,MinGap),MaxGap)$$

Other gap calculations are contemplated. After calculating the allowed gap, the SDM 310 may determine whether the LBA range of the incoming command is overlapped with the range of any one, any combination, or all of the commands in the candidate stream while adding the gap in one or both directions. As one example, the SDM 310 may determine whether the LBA range of the incoming command is overlapped with the range of the last command while adding the gap in both directions. As another example, the SDM 310 may determine whether the LBA range of the incoming command is overlapped with the range of the last command while adding the gap in only one direction (e.g., in the event of stream momentum detection). As still another example, the SDM 310 may determine whether the LBA range of the incoming command is overlapped with the range of one or more of the commands in the candidate stream while adding the gap to one or both directions.

More information about RLA mechanisms can be found in U.S. patent application Ser. No. 15/497,547, which is hereby incorporated by reference. In this RLA mechanism, the management of the SDM RAM 350, which contains different allocated streams, is based on an approach that heavily relies on temporal locality and is prone to suboptimal stream group division, as explained further below. That is, the above method of managing the SDM-RAM 350 uses a stream group allocation approach, in which a new stream group is opened according to the Euclidian distance between the current LBA and the last LBA of each of the stored streams—compared to a pre-defined threshold (a "Gap"). While this approach provides a basic solution for stream allocation, there may be several drawbacks. For example, this approach ignores retrospective information of a hit/miss ratio (e.g., the prior RLA management did not exploit past RLA prediction success ratio, and no feedback analysis was performed of the success statistics per stream in order to optimize the internal stream management).

Figure 4:
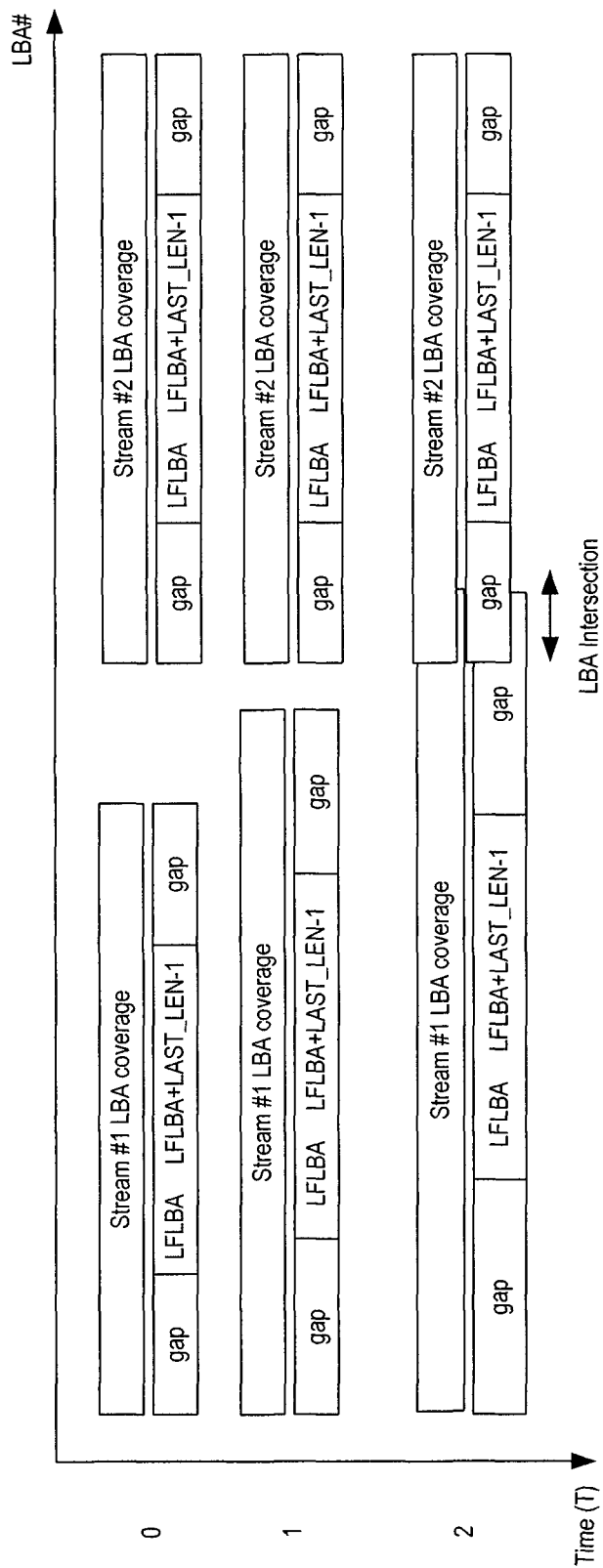
FIG. 4 is an illustration of an embodiment of streams intersecting in their covered logical block address range after time passage.

As another example, the above approach did not consider the evolution of LBA intersection between RLA streams. At the time of stream opening, it obeys a threshold requirement with respect to other stored streams. However, after some time passes, this criterion may not hold anymore for the existing streams in the SDM-RAM 350. As shown in the example on FIG. 4, the LBA range of each of the existing stream groups is expected to widen with time since it was allocated. This phenomenon is related to the fact that, in current SDM-RAM management methods, an attribution of a new LBA to a stream group is based on the latest LBA allocated to each group (not a value indicating the current entire LBA range of the stream group). FIG. 4 illustrates the covered LBA range as a function of time. At T=0, streams #1 and #2 are disjoint, but at T=2 (after the allocation of some LBAs to Stream #1), both streams share an LBA range (which is an undesired streams partition of the RLA).

As yet another example, the number of allowed streams is limited by the SDM-RAM entry number (i.e., there is a fixed RLA stream number). Therefore, the above approach may lead to suboptimal stream division, as opening new streams at later stages is limited to the remaining entries' number. Eventually, the SDM-RAM space will run out, and a new stream will replace the old, least-used stream. This management method does not necessarily represent the actual division of streams and may lead to RLA functioning degradation.

An example that demonstrates this drawback of the prior RLA stream management methods is a situation when the SDM-RAM 350 is filled with streams separated with large gaps from each other. When a new LBA is read which has a Euclidian distance larger than the "gap" but lower in relation to all the existing streams, according to a prior management method, the least recently used stream will be deleted, although it might have an importance to the prediction of future LBAs.

To address these issues, the following embodiments provide an improved feedback based stream management scheme for the RLA mechanism, involving active clustering operations applied on the SDM-RAM 350 and tracking the actual success rates of allocated streams. The proposed scheme will allow a dynamic stream allocation (under the limitations of the SDM-RAM's size) and provide a better stream detection rate, by monitoring temporal stream success rate. As will be seen by the below, considering the posterior "hit-rate" of different streams is an important value in its stream detection or management.

Contrary to prior method based on a single property that characterizes each of the streams, one embodiment involves several features to characterize each of the streams, such as: Number of "stream events" (commands), Overall prediction success rate of current stream, Trend, Command type, Last active time, Average time between consecutive commands, and Average Gap between commands in the stream In addition, in contrast to the prior method, one embodiment tracks whether RLA predicted LBAs match the LBAs that were requested by an NVMe protocol. According to these collected statistics, this embodiment can improve stream management (internal stream allocation).

Based on these features, this embodiment can apply known clustering machine learning algorithms for regrouping (or re-clustering) the existing streams. By that, similar streams will be unified into a single stream, and the number of open streams will be reduced. This embodiment can provide a solution that overcomes the existing limitation of stream allocation and allows an optimized stream covering the used LBA range.

Figure 5:
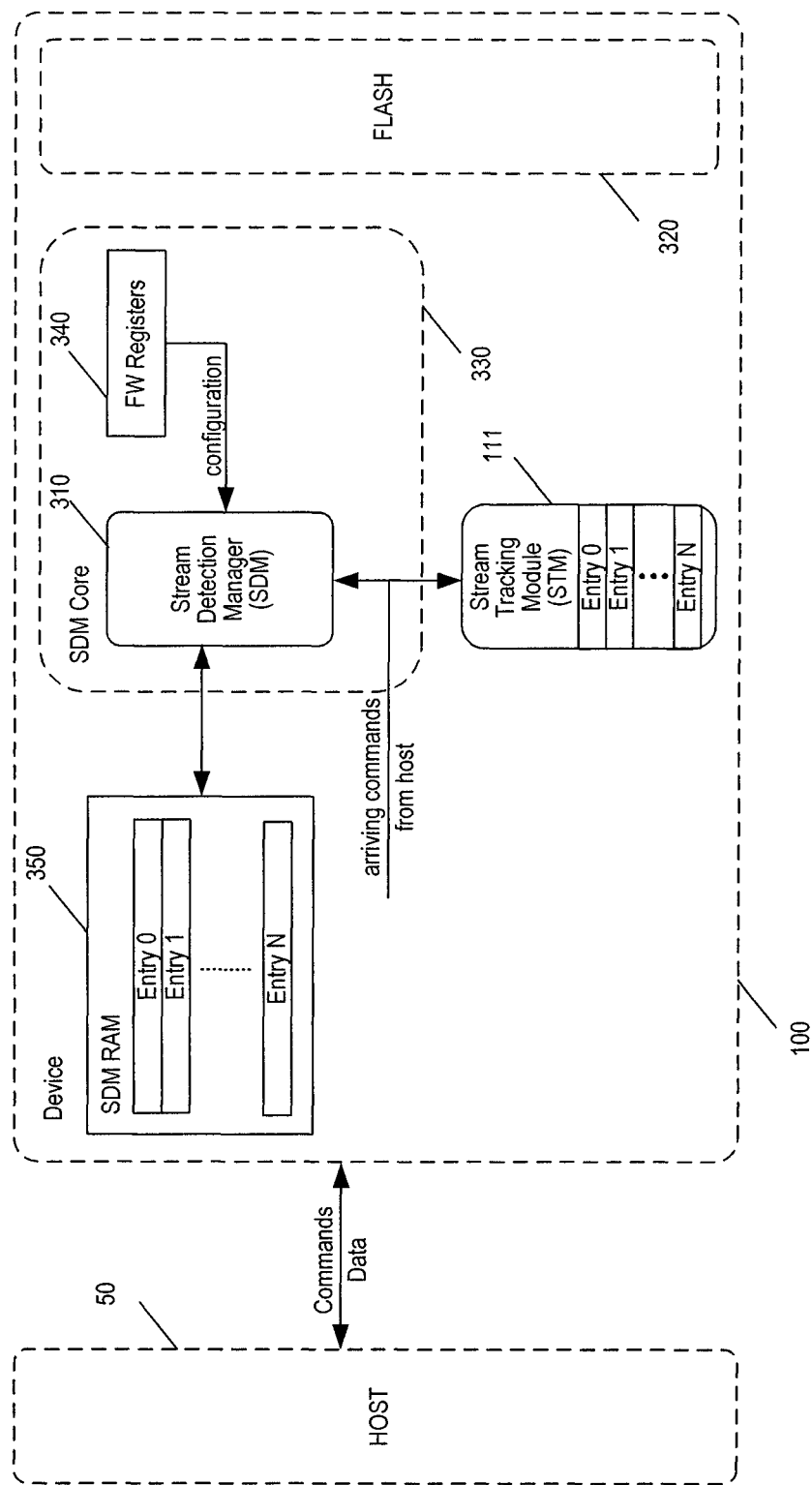
FIG. 5 is an illustration of a host and storage system of an embodiment, in which the storage system comprises a stream tracking module.

One embodiment uses a Stream Tracking Module (STM) 111 (see FIG. 5) which may track the success (hit/miss) ratio of each of the streams. This tracking will be based on the comparison of the arriving commands from the host 50 and the predicted reads pre-fetched by the read look ahead mechanism to the controller 102. FIG. 5 shows the position of the STM 111, which, in some embodiments, may reside inside the SDM core 330. The STM 111 may contain an entry for each of the stored streams. The entry of the STM 111 may contain a value attributed to the success hit rate of pre-fetched commands according to this stream. This value may range from a single bit to full resolution floating point. Naturally, the accuracy of the values may affect the specific application performance.

During RLA operation, when deciding on the stream, the STM 111 may consider also the STM value of the stream and prefer streams that are associated with better success rates. Additionally, during management phases, the least successful streams are good candidates to be either removed or combined with other streams.

Figure 6:
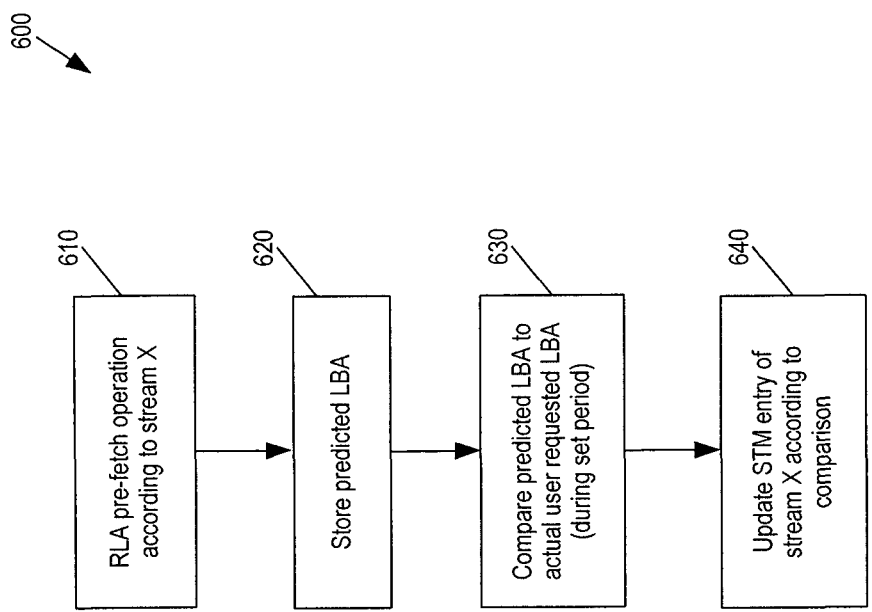
FIG. 6 is a flow chart of a method of an embodiment for updating a stream tracking module.

FIG. 6 is a flow chart 600 of a method of an embodiment for updating the STM 111. As shown in FIG. 6, a read-look ahead pre-fetch operation is performed according to stream X (act 610). The predicted LBA is then stored (act 620). In this act, only a small LBA portion may be stored, as this is relevant to only recently-predicted entries. Next, the controller 102 compares the predicted LBA to the actual user-requested LBA (e.g., during set period) (act 630). Finally, the controller 102 updates the STM entry of stream X according to the comparison (act 640). There may be a success rate decay element, as recent success rates may be more relevant to the future than past success rates. A system-wide combined success rate may be derived to determine the frequency of the RLA management update (and also affect value such as the threshold discussed below in conjunction with FIG. 8).

This embodiment allows a mechanism to define a weight for each stream based on its hit/miss ratio and stream detection output. The larger this combined weight, the more resources may be directed to this stream from the RLA device control. Consider, for example, a situation in which there are two streams in the device controller 102, one with a 100% hit ratio and another with a 25% hit ratio. Device control prefers to speculatively pre-fetch data to the first stream. So, if we have five RLA buffers, four of them will be used by stream #1, and only one of them to stream #2. In other words, if the RLA buffer is 4 KB, the device controller 102 pre-fetches 16 KB for the first stream and only 4 KB for the second stream.

Figure 7:
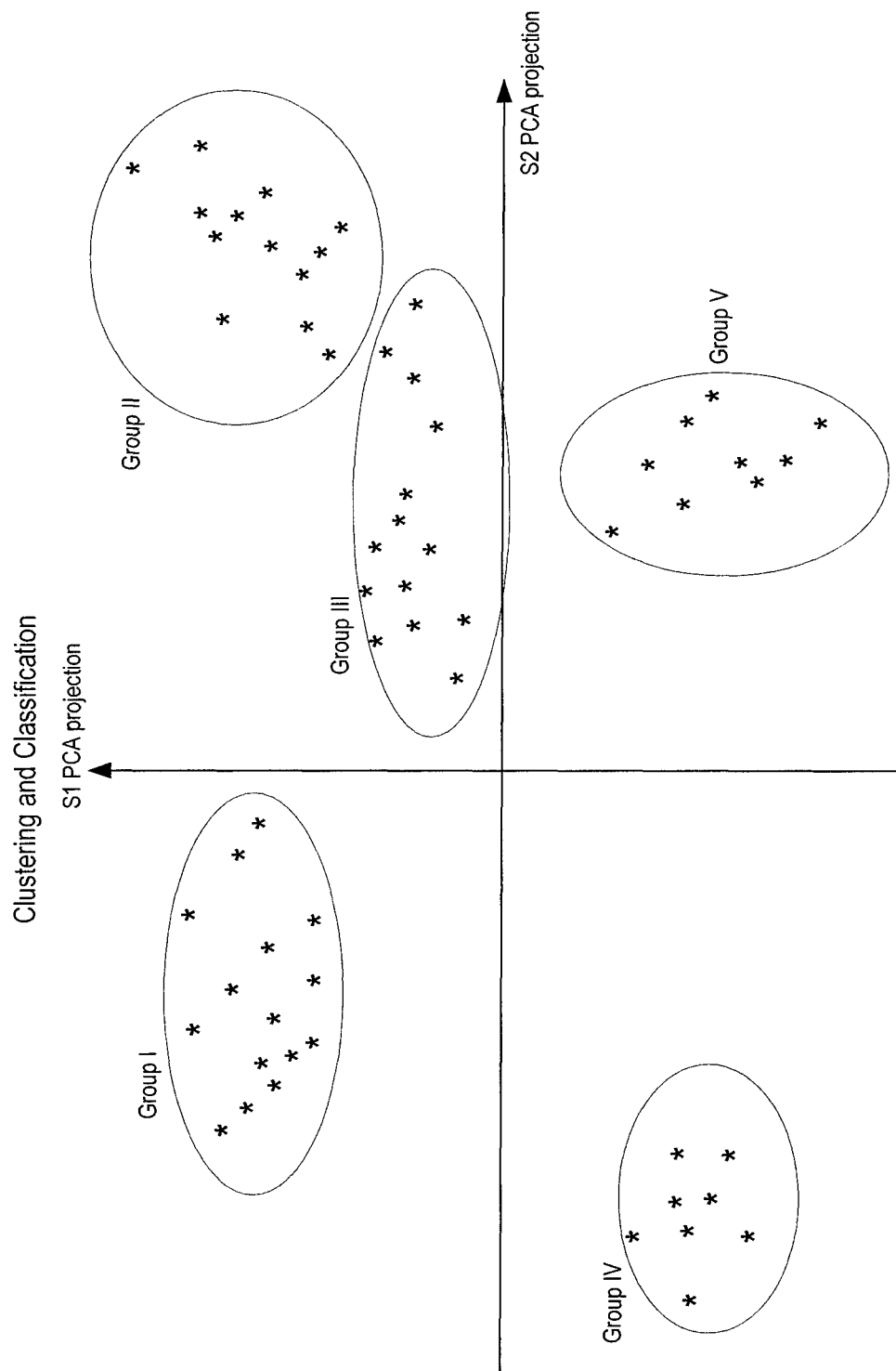
FIG. 7 is an illustration of a principle component analysis-based clustering scheme of an embodiment.

In another embodiment, a machine-learning-based stream management system is used to perform stream unification according to a machine leaning scheme such that similar streams are grouped together and "outlier" streams are mitigated. One way to implement this embodiment is by collecting data regarding the streams' features and then using a transformation, such as a Principle Component Analysis (PCA) scheme, to project input features to lower dimensions and unify streams using a PCA-based clustering scheme (see FIG. 7). As mentioned above, such input features may include, but are not limited to, the number of "stream events," trend, command type, last time the stream was active, average time between consecutive commands that belong to the same stream, and average gap between different LBAs that belong to stream.

The proposed PCA algorithm calculates a symmetric covariance matrix, diagonalizes the matrix, and uses its eigenvectors and eigenvalues. The two (the higher the better, constrained by firmware/hardware complexity) eigenvectors with the highest eigenvalues of the diagonalized covariance matrix are the two dominant PCA vectors. Next, the two PCA eigenvectors are used to project to a lower dimension (a 2D plane) and accordingly cluster the streams, and re-allocate the SDM-RAM according to the clustering. Note that the calculation of the PCA transformation matrix may be done offline (or even calibrated during the design and production stages), while the PCA projection operation is a highly-simplified calculation that may either be done after each stream update, at pre-set points, or dynamically during scheduled management operation.

Figure 8:
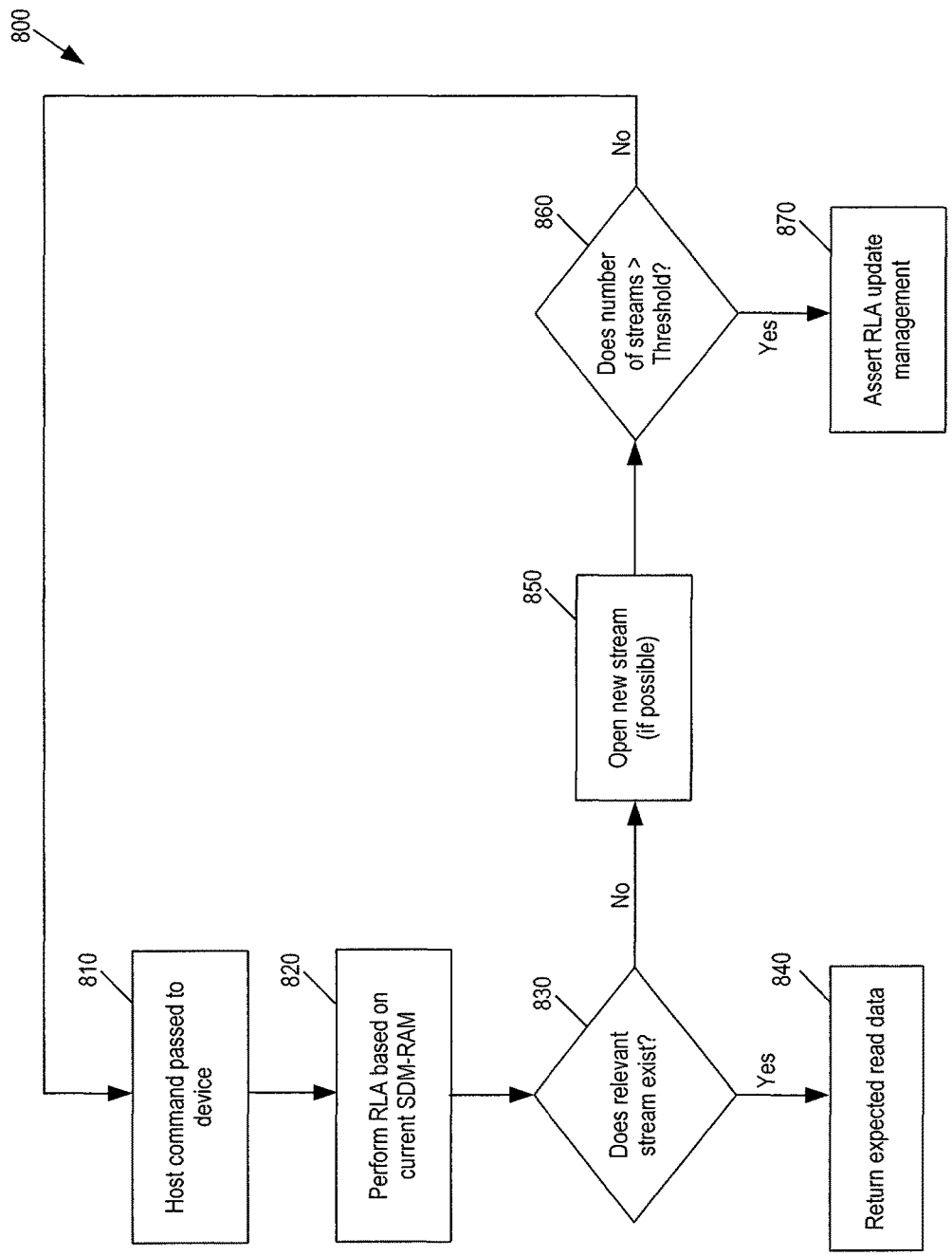
FIG. 8 is a flow chart of a method of an embodiment for read-look-ahead management scheduling.

The scheduling of this management operation may also depend on the status of the SDM-RAM. If the number of streams surpasses some threshold, a management operation may be scheduled, or its frequency increased. This will be described in conjunction with the flowchart 800 in FIG. 8, As shown in FIG. 8, the host command is passed to the device (act 810) and the controller 102 performs read-look ahead based on the current SDM-RAM (act 820). Next, the controller 102 determines if the relevant stream exists (act 830). If it does, the expected read data is returned (act 840). If it does not, the controller 102 opens a new steam if possible (act 850) and determines if the number of streams is greater than a threshold (act 860). If the number of streams is greater than the threshold, the controller 102 asserts PLA update management (act 870).

That is, if a read command does not relate to any of the streams in SDM-RAM, it will open a new stream if possible. If it is not possible, the RLA will be avoided for this command, and the controller 102 may replace an existing stream with the input command as a new stream and also assert RLA for management. If a new stream was opened, the system may check whether the total number of streams is smaller than some threshold, which may depend on the overall size of the SDM-RAM. If this threshold was surpassed, the system 100 may assert RLA for management, so, hopefully, the number of streams is reduced, and stream replacement may be avoided. In addition to the number of streams, the determination of whether the RLA management update should occur can be based on the success rate discussed above.

This approach may improve several aspects of the RLA mechanism. For example, as the RLA mechanism searches through the entire SDM-RAM to find matching streams, reducing the number of streams kept in SDM-RAM (through unification of similar streams) will reduce the RLA latency, thus improving the devices' performance and Quality of Service (QoS). Also, as the SDM-RAM size is limited (usually <64 entries), it is often filled up, and entries are replaced according to a LRU (Least Recently Used) scheme. This scheme is suboptimal since it may potentially lose some important streams that were not used recently. Hence, reducing the number of streams through their unification (without loss of coherence) will improve the overall hit rate of the RLA mechanism. In addition, in contrast to prior systems, the proposed system tracks whether RLA-predicted LBAs match the LBAs that were requested by the NVMe protocol. According to these collected statistics, the method improves the stream management (internal stream allocation).

As another advantage, these embodiments improve RLA prediction rate by providing dynamic updating of the SDM-RAM streams allocation. The overall hit rate of the RLA mechanism is also expected to improve, by avoiding the removal of LRU streams which may be relevant in the future. Another advantage is an improvement of the RLA averaged latency, thus improvement of the device performance and QoS.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A method for stream management, the method comprising:
performing, in a storage system:
receiving a command from a host;
performing a read look ahead operation;
determining whether a relevant stream exists;
in response to determining that the relevant stream exists, returning expected read data; and
in response to determining that the relevant stream does not exist, opening a new stream.

2. The method of claim 1 further comprising determining if a number of streams is greater than a threshold.

3. The method of claim 2 further comprising performing a read look ahead update management operation in response to determining that the number of streams is greater than the threshold.

4. A storage system comprising:
a controller configured to:
characterize each of a plurality of streams using an average time between consecutive commands in each of the plurality of streams; and
unify two or more of the plurality of streams together based on characterization of each of the plurality of streams.

5. The storage system of claim 4, wherein the controller is further configured to perform a read look ahead operation.

6. A storage system comprising:
a controller configured to:
characterize each of a plurality of streams using an average gap between commands in each of the plurality of streams; and
unify two or more of the plurality of streams together based on characterization of each of the plurality of streams.

7. A storage system comprising:
a controller configured to:
characterize each of a plurality of streams;
unify two or more of the plurality of streams together based on characterization of each of the plurality of streams;
perform a read look ahead operation; and open a new stream in response to the read look ahead operation.

8. The storage system of claim 7, wherein the controller is further configured to:
determine if a number of the plurality of streams exceeds a threshold number; and
in response to determining that the number of the plurality of streams exceeds the threshold number, perform a real look ahead management operation.

* * * * *